(12) United States Patent
McGrane et al.

(10) Patent No.: US 7,793,120 B2
(45) Date of Patent: Sep. 7, 2010

(54) DATA STRUCTURE FOR BUDGETING POWER FOR MULTIPLE DEVICES

(75) Inventors: Sean Nicholas McGrane, Sammamish, WA (US); John M. Parchem, Seattle, WA (US); Stephen Roland Berard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 902 days.

(21) Appl. No.: 11/655,383

(22) Filed: Jan. 19, 2007

(65) Prior Publication Data

US 2008/0178018 A1 Jul. 24, 2008

(51) Int. Cl.
G06F 1/26 (2006.01)
(52) U.S. Cl. ............. 713/300; 713/320; 713/322; 713/323
(58) Field of Classification Search .......... 713/300
See application file for complete search history.

(56) References Cited

U.S. PATENT DOCUMENTS

| | | | |
|---|---|---|---|
| 5,483,656 A * | 1/1996 | Oprescu et al. | 713/320 |
| 5,532,945 A | 7/1996 | Robinson | |
| 5,560,022 A | 9/1996 | Dunstan | |
| 5,694,607 A | 12/1997 | Dunstan et al. | |
| 5,919,264 A * | 7/1999 | Reneris | 713/324 |
| 5,964,879 A | 10/1999 | Dunstan | |
| 6,498,460 B1 | 12/2002 | Atkinson | |
| 6,651,178 B1 * | 11/2003 | Voegeli et al. | 713/300 |
| 6,859,882 B2 | 2/2005 | Fung | |
| 6,986,069 B2 | 1/2006 | Oehler et al. | |
| 6,990,593 B2 | 1/2006 | Nakagawa | |
| 7,043,647 B2 * | 5/2006 | Hansen et al. | 713/320 |
| 7,051,215 B2 | 5/2006 | Zimmer et al. | |
| 7,058,828 B2 | 6/2006 | Barr | |
| 7,493,503 B2 * | 2/2009 | Aldereguia et al. | 713/300 |
| 2003/0037150 A1 | 2/2003 | Nakagawa | |
| 2005/0091550 A1 | 4/2005 | Tani | |
| 2006/0082222 A1 | 4/2006 | Pincu et al. | |
| 2006/0136754 A1 | 6/2006 | Liu et al. | |
| 2008/0133946 A1 * | 6/2008 | Diab et al. | 713/310 |

FOREIGN PATENT DOCUMENTS

WO WO03025745 A2 3/2003

OTHER PUBLICATIONS

Bianchini et al., "Power and Energy Management for Server Systems", Date: Jun. 2003, http://citeseer.ist.psu.edu/cache/papers/cs/27927/ftp:zSzzSzwww.cs.rutgers.eduzSzpubzSztechnical-reportszSzdcs-tr-528.pdf/bianchini03power.pdf.

(Continued)

Primary Examiner—Nitin C Patel (57) ABSTRACT

Aspects of the subject matter described herein relate to a data structure for budgeting power for multiple devices. In aspects, devices are allotted a power budget. The devices are each capable of operating at one or more power levels. A console queries the devices to obtain the power capabilities of the devices. The console stores the power capabilities in a data structure. The data structure together with the power budget may then be used to instruct each device to operate at a particular power level. The data structure includes fields for storing power levels for the devices as well as fields that associate the power levels with the devices. In addition, the data structure includes a group field that associates the devices with the power budget.

20 Claims, 6 Drawing Sheets

OTHER PUBLICATIONS

Chase et al., "Balance of Power: Energy Management for Server Clusters", http://citeseer.ist.psu.edu/cache/papers/cs/20292/http:zSzzSzwww.cs.duke.eduzSzarizSzpublicationszSzbalance-of-power.pdf/chase01balance.pdf.

Felter et al., "On the performance and use of dense servers", Date: 2003, vol. 47, No. 5/6, http://www.research.ibm.com/journal/rd/475/felter.html.

Heath et al., "Energy Conservation in Heterogeneous Server Clusters", Date: 2005, http://delivery.acm.org/10.1145/1070000/1065969/p186-heath.pdf? key1=1065969&key2=0680943611&coll=GUIDE&dl=GUIDE&CFID=6082234&,CFTOKEN=81101117.

International Search Report dated May 21, 2008 for Application No. PCT/US2008/050294, 10 pages.

* cited by examiner

Power Capabilities Data Structure ⌐300

| Server ID 305 | Power Profile 310 | Power Level 315 |
|---|---|---|
| Server1 | PP1 | 700W |
| Server1 | PP2 | 600W |
| Server1 | PP3 | 500W |
| Server1 | PP4 | 400W |
| Server1 | PP5 | 300W |
| ... | ... | ... |
| ServerN | PP1 | 450W |

Power Budget Data Structure ⌐320

| GroupID | Power Budget |
|---|---|
| Rack1 | 10 KW |
| Rack2 | 7 KW |
| Assorted_Servers | 3 KW |
| Network_Devices | 1 KW |
| Blade_Server1 | 10KW |
| ... | ... |
| GroupN | 5KW |

| Power Profile | Power Level |
|---|---|
| PP1 | 700W |
| PP2 | 600W |
| PP3 | 500W |
| PP4 | 400W |
| PP5 | 300W |

410 —

| Power Profile | Power Level |
|---|---|
| PP1 | 650W |
| PP2 | 500W |
| PP3 | 400W |

415 —

| Power Profile | Power Level |
|---|---|
| PP1 | 650W |
| PP2 | 550W |
| PP3 | 450W |
| PP4 | 350W |

FIG. 6

DATA STRUCTURE FOR BUDGETING POWER FOR MULTIPLE DEVICES

BACKGROUND

A data center may include racks of servers, networking equipment, and other electronic devices. To determine how many devices a data center may handle, a power rating value of the power supply unit of each device may be used. This value is referred to as 'label power' and is typically much higher than the maximum power the particular device could ever draw. Using the 'label power' results in budgeting too much power for each device, and, as a result, servers may be populated more sparsely than they need to be. Data center floor space is very expensive and this under utilization has a negative effect on the total cost of ownership for the data center.

SUMMARY

Briefly, aspects of the subject matter described herein relate to a data structure for budgeting power for multiple devices. In aspects, devices are allotted a power budget. The devices are each capable of operating at one or more power levels. A console queries the devices to obtain the power capabilities of the devices. The console stores the power capabilities in a data structure. The data structure together with the power budget may then be used to instruct each device to operate at a particular power level. The data structure includes fields for storing power levels for the devices as well as fields that associate the power levels with the devices. In addition, the data structure includes a group field that associates the devices with the power budget.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
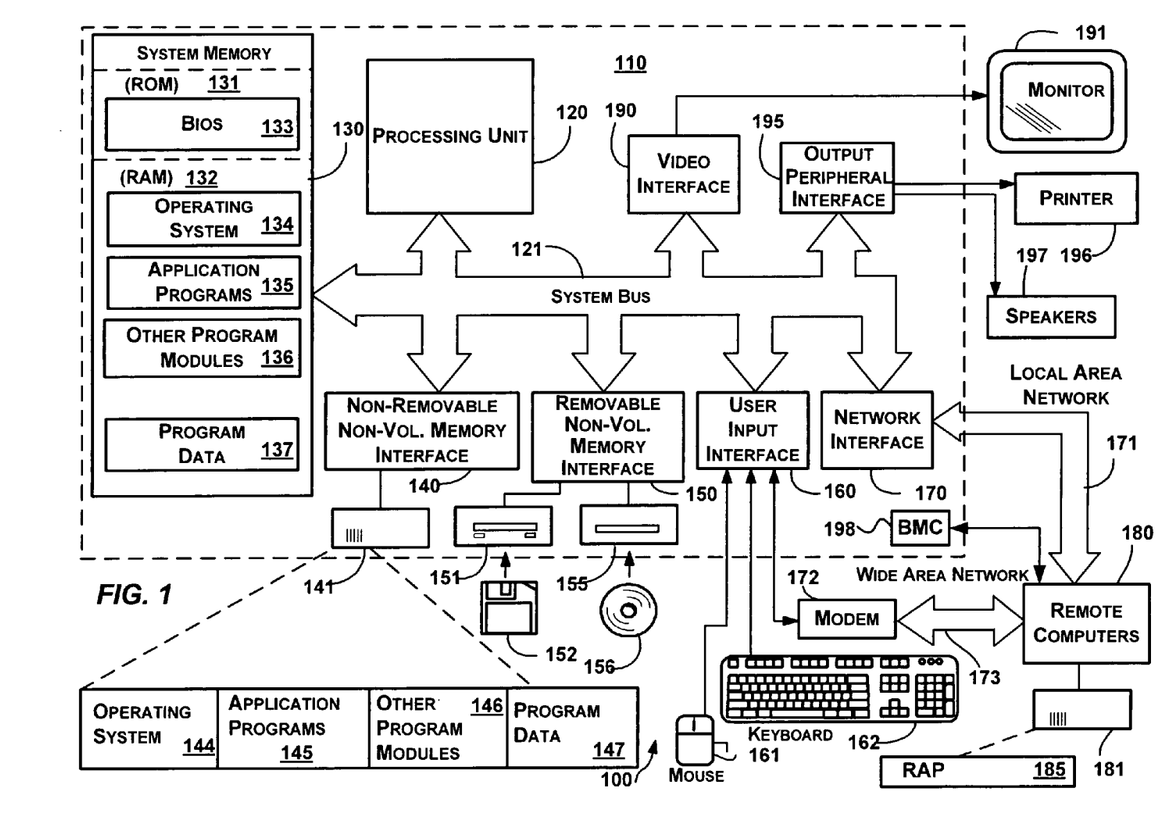
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, other than communication media, which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A baseboard management controller (e.g., BMC 198) may be embedded on the computer 110 to allow the computer 110 to communicate with other devices out-of-band (e.g., without using an operating system). The BMC 198 may be able to report temperature, cooling fan speeds, power mode, operating system status, and the like to a console (such as console 205 of FIG. 2). The BMC 198 may include a processor that is capable of operating at a very low power draw when other components of the computer 110 are turned off. In addition, the BMC 198 may communicate what power capabilities the computer 110 has and may be able to set the power level of the computer 110. Power capabilities include the different power level(s) at which the computer 110 is able to operate.

Power Capabilities Data Structure and Budgeting

Figure 2:
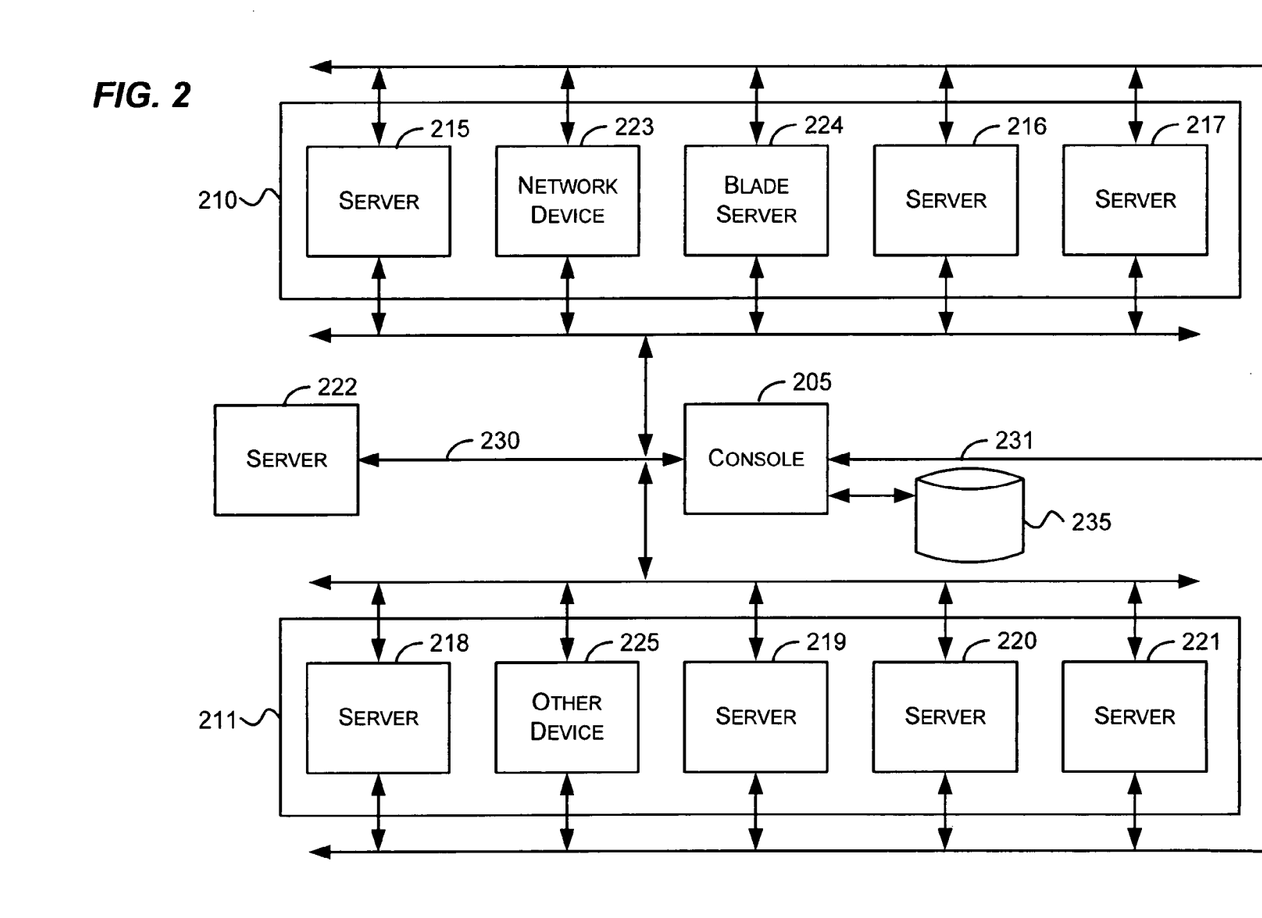
FIG. 2 is a block diagram of an exemplary system in which aspects of the subject matter described herein may operate.

A data center may include many servers and electronic devices as shown in FIG. 2. The data center needs to be able to supply enough power to the devices and also needs to be able to have enough cooling capacity to keep the devices at a safe operating temperature. Many of the devices in a data center may be mounted in racks while other of the devices may be free-standing. Each rack may be assigned a particular power budget. For correct operation, the combined power consumed by the devices in a rack should not exceed its assigned power budget. Doing so may cause a breaker to switch off or may cause too much heat which may adversely affect other components in the rack or in other racks. On the other hand, it is beneficial to utilize as much of the budget as needed so that rack and floor space in the data center are not wasted.

FIG. 2 is a block diagram of an exemplary system in which aspects of the subject matter described herein may operate. The system includes a console 205 (e.g., a central management console), racks 210-211, devices 215-225, and communication channels 230-231.

The devices 215-225 may include servers (e.g., servers 215-222), network devices (e.g., network device 223), blade servers (e.g., blade server 225), and other devices (e.g., other device 225). The rack 210 houses the servers 215-217, the network device 223, and the blade server 224 while the rack 211 houses the servers 218-221 and the other device 225. The server 222 may be free-standing and may be located outside of a rack. An exemplary device that may be used as a server such as one of servers 215-222 is the computer 110 of FIG. 1 configured with appropriate hardware and software. A data center may have more or fewer devices like the ones represented in FIG. 2.

The communication channel 230 may include one or more networks that connect the devices 215-225 to the console 205 and to other devices and or networks such as the Internet (not shown). A suitable networking protocol such as the TCP/IP protocol, token ring protocol, or some other network protocol may be used to communicate via the communication channel 230.

The communication channel 231 may comprise a network, point-to-point links (e.g., serial connections), or other communication link that allows communication with the devices 215-225 "out-of-band." Out-of-band in this sense refers to being able to communicate with the devices without regard to the operating system on the devices 215-225.

In one embodiment, a baseboard management controller (BMC) may be embedded on a device to allow the console 205 to communicate with the device out-of-band. An exemplary BMC (e.g., BMC 198) is described in conjunction with FIG. 1. As described previously, the BMC may be able to report temperature, cooling fan speeds, power mode, operating system status, and the like to the console 205. In addition, the BMC may communicate what power capabilities its corresponding device has and may be able to set the power level of the device. Power capabilities include the different power level(s) at which a device is able to operate.

The console 205 may store these power capabilities in one or more data structures located on a storage device 235. The storage device 235 may comprise computer-readable media such as the computer-readable media described in conjunction with FIG. 1, for example. Some exemplary formats of these data structures are described in more detail in conjunction with FIGS. 3 and 4. In general, the one or more data structures (hereinafter sometimes referred to simply as the "data structure") includes the various power level(s) at which each device is able to operate and includes a way of identifying the device associated with each power level. In addition, the data structure may associate a location (e.g., rack) with each device. The data structure may also include a power budget that is associated with a set of devices. These set of devices may be physically collocated (e.g., in a single rack), or may be spread throughout a data center.

In one embodiment, the data structure does not include information regarding how the devices are able to implement a power level. For example, the data structure may not include what components a device powers on or off or places in an increased or reduced power state to achieve a power level. Instead, the data structure may simply include the power levels at which the device is capable of operating. In other words, the details of which components are running in which power modes on a particular server are transparent to a console using the data structure.

As used herein, when a device is operating at a power level, this does not necessarily mean that the device consumes the entire amount of the power level at all times. Rather, it means that the device is expected to consume no more than the power level. The device may consume less power when it has less work to do, for example. When the device is fully loaded with work to do, it should not (but may accidentally) consume more power than the power level at which it is operating.

In this embodiment, omitting power information about components of each device provides flexibility to describe new power levels that may be introduced in the future. For example, a data structure that was structured to obtain power information about a pre-determined set of hardware may not work properly if new hardware is developed. In addition, having the device determine which components to place in a different power state based on a console commanded power level allows device manufacturers to cause their devices to operate within certain tested configurations.

Using the data structure, the power management software on the console 205 (or on any other machine capable of accessing the storage device 235) may accurately determine how much power is needed by a set of devices and how much power from a budget is remaining for a set of devices. Where location information is included, the power management software may determine whether additional devices may be added to a set of devices (e.g., on a rack) and still consume less power than the power budget allocated to the set of devices.

A device may be instructed to operate at a supported power level by sending a command to the device to operate at the power level. In one embodiment, if the device is under control of an operating system, this may be done through the communication channel 230 by communicating with the operating system (or software executing thereon). In another embodiment, this may be done out-of-band via the communication channel 231 regardless of whether the device is under control of an operating system. When the device receives the command, it determines which components to power on or off or to reduce or increase in power consumption to meet the power level specified by the command. For example, when operating above its minimum power consumption, a CPU may be instructed to decrease its power consumption.

Figure 3:
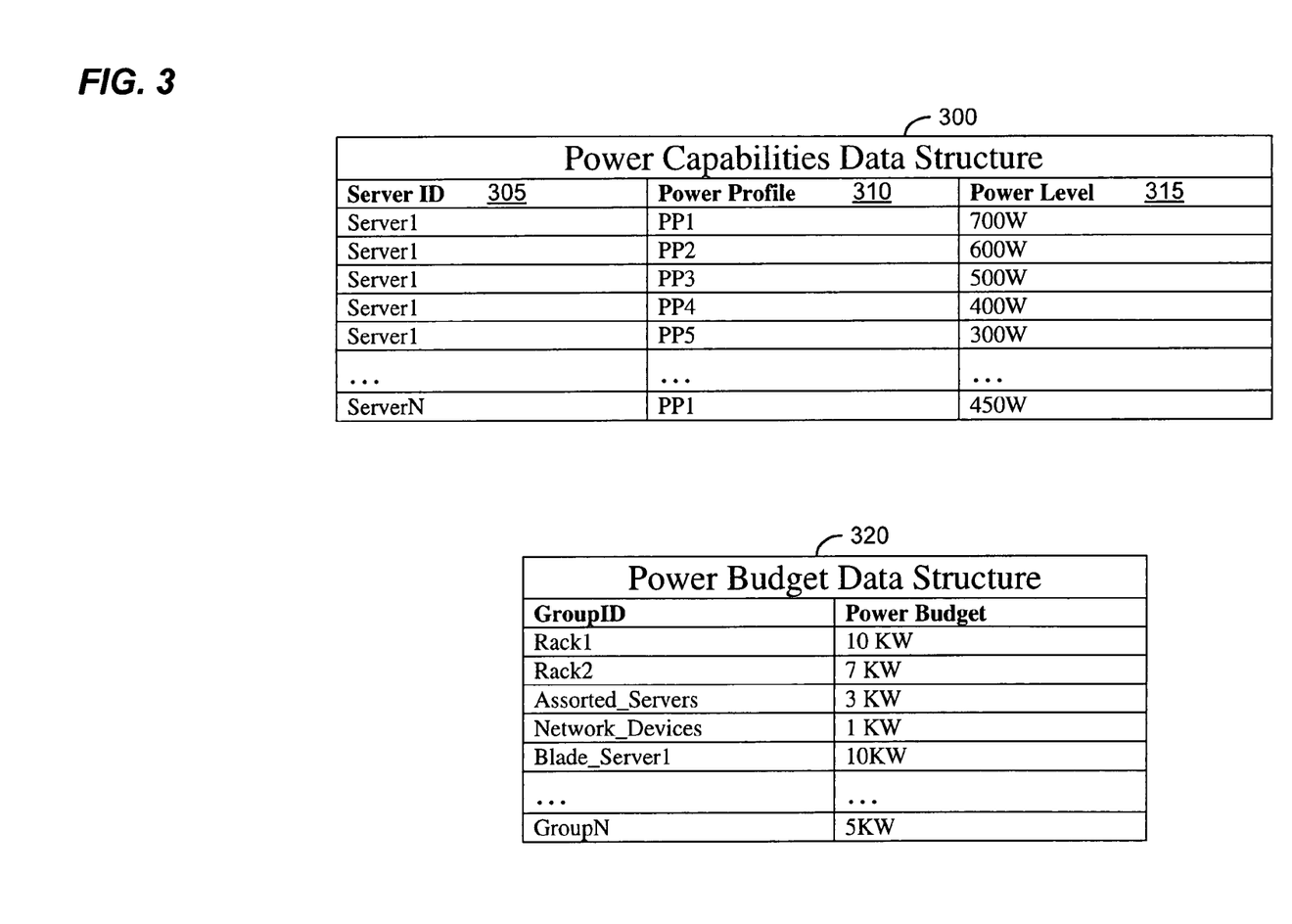
FIG. 3 illustrates some exemplary data structures that may be used in accordance with aspects of the subject matter described herein.

FIG. 3 illustrates some exemplary data structures that may be used in accordance with aspects of the subject matter described herein. The data structure 300 includes a server ID field 305, a power profile field 310, and a power level field 315. The power level field 315 indicates a maximum power that the device may consume when assigned to its associated power profile The server ID field 305 includes entries that associate the power levels with devices. These entries may include unique identifiers that identify the devices.

In one embodiment, the power profile field 310 may be omitted from the data structure 300. In this embodiment, a device may be instructed to operate at a power no greater than a particular power level by sending the power level to the device.

The titles of each field and the title of the data structure itself are optional and need not be stored in the data structure.

The data structure 300 includes an entry for each power level of each device for which power budgeting is desired. In another embodiment, another field may be added to or associated with the data structure 300 that includes a location (e.g., rack number, physical location as indicated, for example, by coordinates, etc.) or grouping of devices that are affected by a common power budget. This field may be used in conjunction with a power budget data structure 320 to allocate power to each device in the group. In one embodiment, the power budget data structure 320 may include the power budget for all collections of devices in a data center.

A data structure (not shown) may also be used to indicate the power profiles that are currently active on the devices. In one embodiment, the data structure may include a device ID field and a power profile field for each device. This data structure may be used in conjunction with the power capabilities data structure 300 to determine the current power level for each device, for example.

Figure 4:
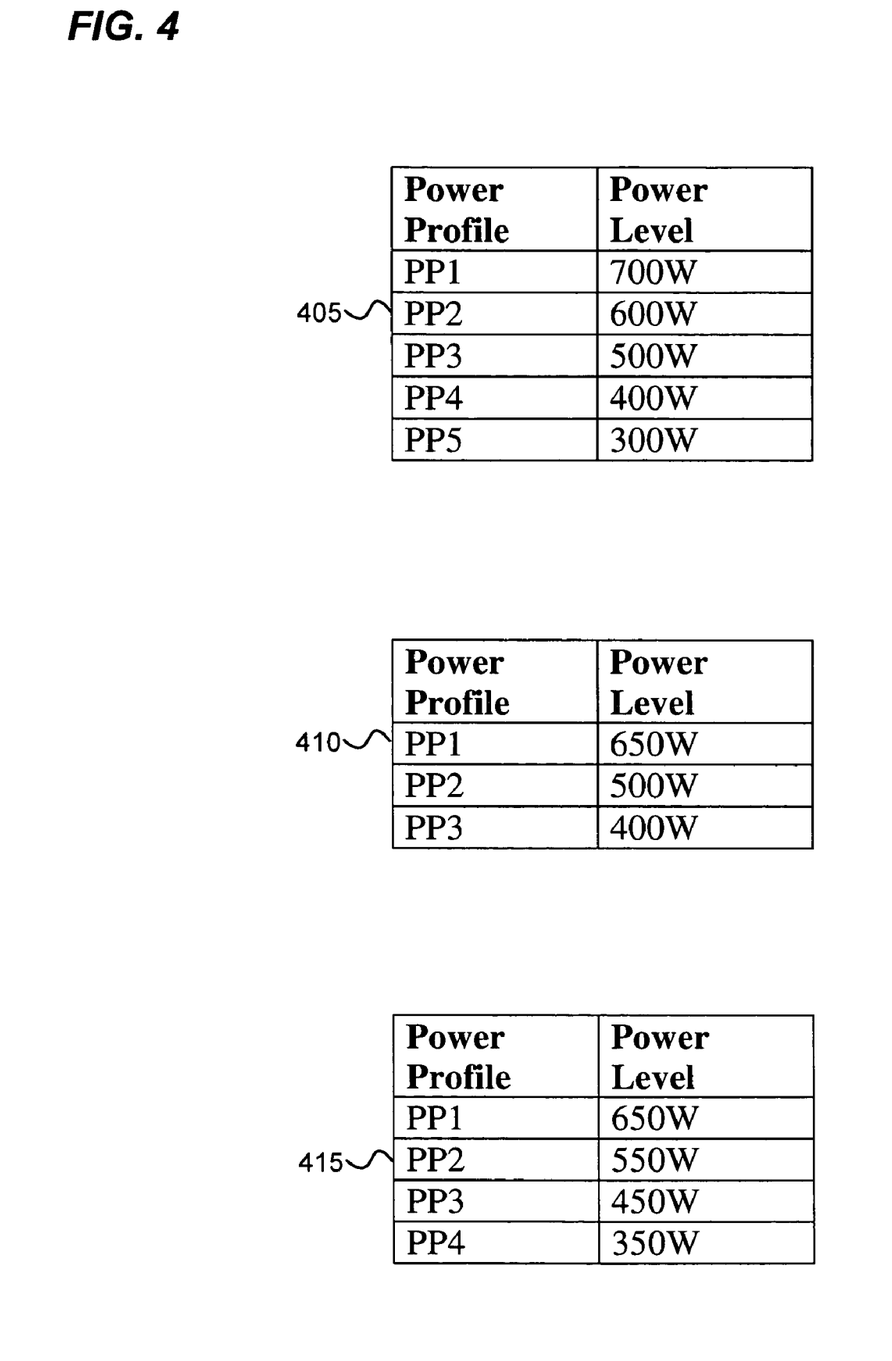
FIG. 4 illustrates an exemplary set of data structures that may be used in accordance with aspects of the subject matter described herein.

FIG. 4 illustrates an exemplary set of data structures that may be used in accordance with aspects of the subject matter described herein. The data structures 405-415 correspond to three separate devices and include information that indicates the power capabilities of each of the devices. The data structures 405-415 may be stored in such a way as to indicate with which device they are associated. For example, the data structures 405-415 may each be stored together with an identifier that identifies their respective devices. As another example, they may be stored in an object oriented database that includes a single device identifier for each data structure to identify its associated device.

In addition, an additional field or data item may be associated with each data structure. This additional field or data item may be used to identify a set of devices that are governed by the same power budget.

It will be recognized by those skilled in the art that there are many ways in which to create data structures that identify power capabilities of devices. There are also many ways of associating each data structure with a particular device. To be operable with aspects of the subject matter described herein, the information that is needed is the power levels of each device and a mechanism for identifying a particular device for a given power level. As long as this needed information is available, any of these ways may be used without departing from the spirit or scope of the subject matter described herein.

Figure 5:
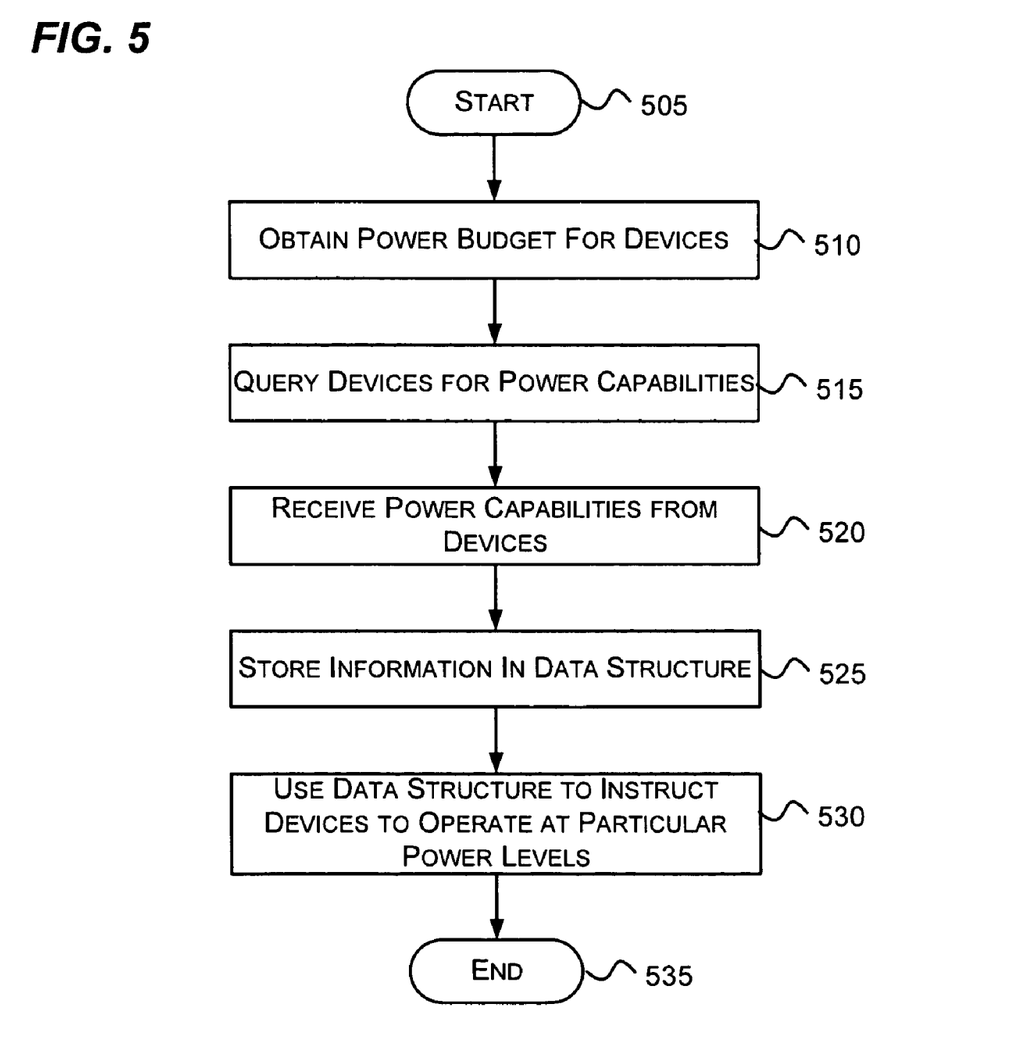
FIG. 5 is a flow diagram that generally represents exemplary actions that may occur in creating and using a power data structure in according with aspects of the subject matter described herein.

FIG. 5 is a flow diagram that generally represents exemplary actions that may occur in creating and using a power data structure in according with aspects of the subject matter described herein. At block 505, the actions begin.

At block 510, a power budget for a set of devices is obtained. For example, referring to FIG. 2, the console 205 may obtain the power budget for the rack 210.

At block 515, the devices are queried for their power capabilities. For example, referring to FIG. 2, the console 205 queries the servers 215-217, the network device 223, and the blade server 225 for their power capabilities. The console 205 may query each device individually through an out-of-band or in-band connection. A power capability includes a power level at which a device is capable of operating.

At block 520, the power capabilities of the devices are received. For example, referring to FIG. 2, the console 205 receives the power capabilities from the servers 215-217, the network device 223, and the blade server 225.

At block 525, these power capabilities are stored in a data structure. For example, referring to FIGS. 2 and 3, the power capabilities data structure 300 is stored on the storage device 235.

At block 530, the data structure is used to instruct devices to operate at a particular power level. For example, referring to FIG. 2, the console 205 instructs each of the servers 215-217, the network device 223, and the blade server 225 to operate at particular power levels. The power level from device to device may be different even if the devices are similar or identical.

At block 535, the actions end.

Figure 6:
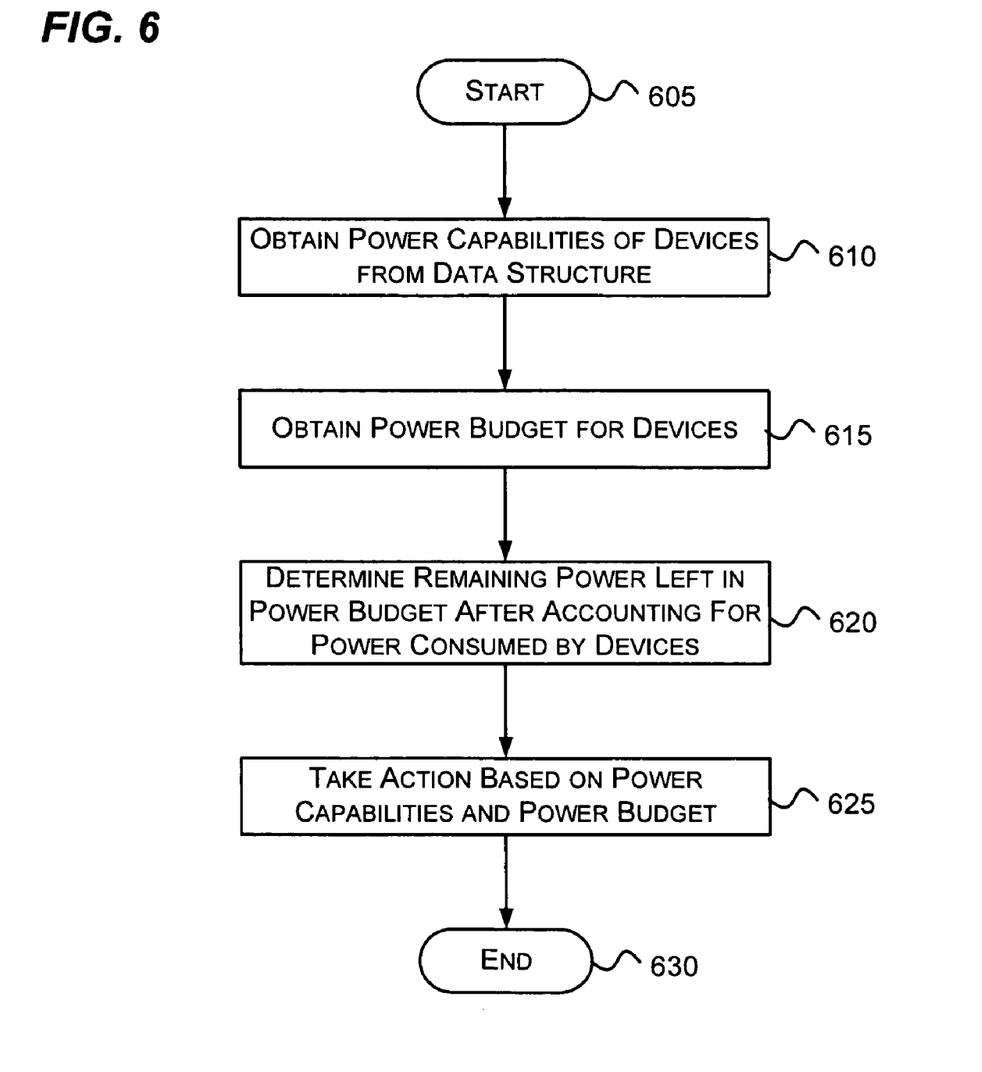
FIG. 6 is a flow diagram that generally represents exemplary actions that may occur in using a power data structure in according with aspects of the subject matter described herein.

FIG. 6 is a flow diagram that generally represents exemplary actions that may occur in using a power data structure in according with aspects of the subject matter described herein. At block 605, the actions begin.

At block 610, power capabilities of devices are obtained from the data structure. For example, referring to FIG. 4, the power capabilities from the data structures 405-415 are obtained.

At block 615, the power budget for the devices is obtained. For example, referring to FIG. 2, the console 205 obtains the power budget from a data store (e.g., the storage 235) or a user.

At block 620, the remaining power left in a power budget after accounting for power consumed by the devices is determined. For example, referring to FIG. 2, the console 205 determines what power is remaining (if any) or by how much the power is exceeded after accounting for the power consumed by the devices in the rack 210.

At block 625, action is taken based on the power capabilities and the power budget. This action may include, for example, instructing one or more devices to operate at specified power levels, indicating how much power is remaining of a power budget, determining where a new device can be placed (based on remaining power budget), determining a device that needs to be moved to another power budget, and so forth.

At block 630, the actions end.

As can be seen from the foregoing detailed description, aspects have been described related to a data structure for budgeting power for multiple devices. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable storage medium having computer-executable instructions, which when executed perform actions, comprising:
   querying a plurality of devices for power capabilities, wherein a power capability comprises a power level at which a device is capable of operating, wherein at least one of the plurality of devices is capable of operating at two or more power levels;
   from each of the plurality of devices, receiving information that indicates one or more power capabilities of a corresponding device, wherein the information comprises a power level for each of the one or more power capabilities of the corresponding device; and
   storing the information in a data structure together with one or more identifiers that associate each power capability with its corresponding device.

2. The computer-readable storage medium of claim 1, wherein the data structure is accessible via out of band management.

3. The computer-readable storage medium of claim 1, further comprising obtaining a power budget associated with the plurality of devices.

4. The computer-readable storage medium of claim 3, further comprising instructing each of the plurality of devices to operate at one of its power capabilities in order to consume less power than the power budget.

5. The computer-readable storage medium of claim 1, wherein the plurality of devices comprises all servers in a rack at a data center.

6. The computer-readable storage medium of claim 1, wherein the plurality of devices comprises blades of a blade server.

7. The computer-readable storage medium of claim 1, wherein the plurality of devices comprises all servers at a data center.

8. The computer-readable storage medium of claim 1, wherein the plurality of devices comprises networking equipment at a data center.

9. The computer-readable storage medium of claim 1, wherein the plurality of devices comprises storage devices at a data center.

10. A method implemented at least in part by a computer, the method comprising:
    employing at least one processing unit configured to execute computer-executable instructions stored in memory to perform the following acts:
    obtaining power capabilities of a plurality of devices from one or more data structures that reside externally from the plurality of devices, wherein a power capability indicates a power level at which a device is capable of operating, wherein at least one of the plurality of devices is capable of operating at least one two or more power levels;
    obtaining a power budget that indicates a maximum power allotted to the plurality of devices; and
    taking an action based on the power capabilities and the power budget.

11. The method of claim 10, wherein the action comprises instructing each of the devices to operate at one of its power capabilities in order to consume no more power than the power budget.

12. The method of claim 10, wherein the power budget applies to devices in a rack.

13. The method of claim 10, wherein the data structures reside on nonvolatile media accessible from a management console.

14. The method of claim 10, wherein each of the devices comprises a server including at least one processor and having access to one or more storage devices.

15. The method of claim 10, wherein the action comprises determining a location at which to place another device.

16. The method of claim 10, wherein the action comprises adding another device to the plurality of devices, wherein after the adding, the plurality of devices and the device consume less power than the power budget.

17. The method of claim 10, further comprising determining remaining power left in the power budget via the one or more data structures.

18. A computer-readable storage medium having stored thereon a data structure, comprising:
    a plurality of fields for storing power levels of a plurality of devices that are allotted a power budget over which a combined power draw of the devices is not to exceed, each power level indicating a maximum power its corresponding device is not to exceed at the power level, wherein at least one of the plurality of devices is capable of operating at two or more power levels;
    a plurality of fields for storing associations between the power levels and the devices, each power level being associated with at least one of the plurality of devices that is capable of operating at the power level; and
    a group field for associating the plurality of devices with the power budget.

19. The computer-readable storage medium of claim 18, further comprising a plurality of power profiles, each power profile associated with one of the power levels, the power profile serving to identify the power level to a device capable of operating at the one of the power levels.

20. The computer-readable storage medium of claim 18, further comprising a power budget field for storing the power budget.

* * * * *